United States Patent Office

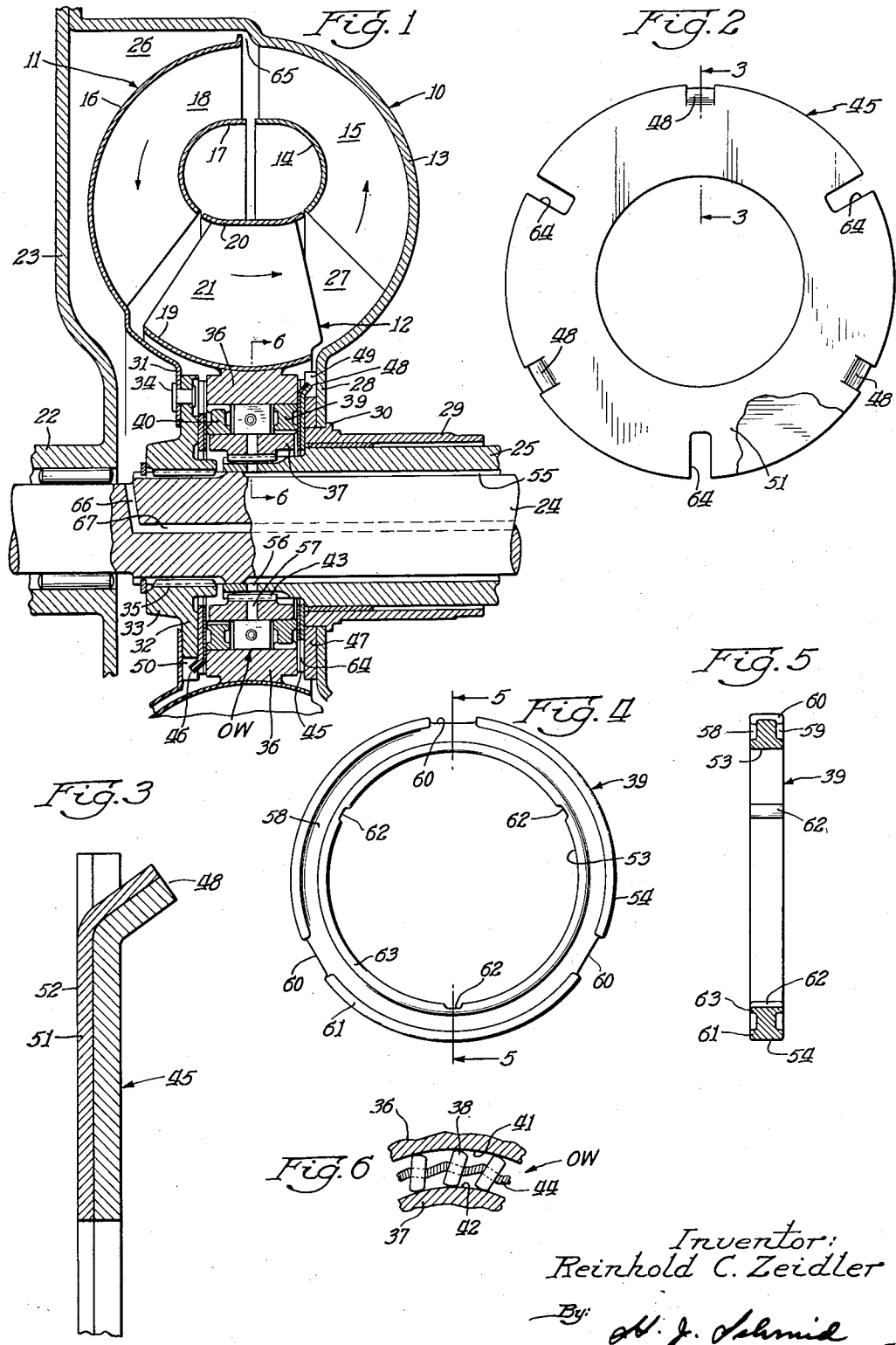
March 6, 1956 R. C. ZEIDLER 2,737,423
MOUNTING ASSEMBLY FOR RELATIVELY ROTATABLE MEMBERS
Filed May 31, 1951
Inventor:
Reinhold C. Zeidler
By: H. J. Schmid
Atty.

2,737,423
Patented Mar. 6, 1956

2,737,423

MOUNTING ASSEMBLY FOR RELATIVELY ROTATABLE MEMBERS

Reinhold C. Zeidler, Detroit, Mich., assignor to Borg-Warner Corporation, Chicago, Ill., a corporation of Illinois Application May 31, 1951, Serial No. 229,103

5 Claims. (Cl. 308—163)

The present invention relates to mounting assemblies for relatively rotatable members and more particularly to an improved mounting assembly of this type including a bearing and thrust washer arrangement adapted for use between relatively rotatable members.

An object of the invention is to provide an improved mounting assembly for members relatively rotatable about an axis and including a bearing and thrust washer arrangement, disposed between the members, the arrangement comprising elements positioned between the members for taking axial thrust and providing bearing surfaces engaging the members.

Another object of the invention is to provide an improved mounting assembly for relatively rotatable members and including bearing and thrust washer elements designed to permit lubrication of the bearing surfaces of the elements and the surfaces of the relatively rotatable members engaged thereby.

A further object of the invention is to provide an improved form of thrust washer having projections formed thereon and connected to one of two relatively rotatable members and having a bearing surface engaging the other of the members.

A specific object of the invention is to provide an improved mounting assembly for relatively rotatable vaned members of a hydraulic torque converter and comprising a novel arrangement of spaced bearing and thrust washers in such assembly for taking thrust and for maintaining concentricity of certain parts of the mounting assembly, the assembly being further characterized by the washers being formed and cooperating with other parts of the assembly to provide passages for directing fluid, such as oil, into the converter fluid circuit and also onto the engaged bearing surfaces of the washers and vaned members.

Other objects and advantages of the invention will become apparent during a consideration of the following written description of my invention taken in connection with the accompanying drawing in which:

Fig. 1 is an axial section of a hydraulic torque converter embodying my improved mounting assembly;

Fig. 2 is a face view of a novel bearing and thrust washer of the mounting assembly shown in Fig. 1;

Fig. 3 is a section of a greatly enlarged fragmentary portion of the washer shown in Fig. 2, said section being taken on line 3—3 of Fig. 2;

Fig. 4 is a face view of a spacer of the mounting assembly shown in Fig. 1;

Fig. 5 is a section of the spacer shown in Fig. 4, said section being taken on line 5—5 of Fig. 4;

Fig. 6 is a fragmentary sectional view of the one-way brake structure shown in Fig. 1, said section being taken on line 6—6 of Fig. 1.

Like characters of reference in the several views represent like parts of the mechanism.

Referring now to the drawing, and particularly Fig. 1 thereof, the improved mounting assembly is shown as embodied in a hydraulic torque converter having relatively rotatable vaned elements, including a pump or impeller 10, a turbine or runner 11, and a stator or reactor 12. The impeller 10 comprises a hollow, semi-toroidal annular steel shell 13 and core ring 14, and a plurality of vanes 15 extending therebetween and connecting the same. The turbine 11 also comprises a hollow annular steel shell 16 and core ring 17 connected by vanes 18. The stator 12 comprises spaced annular steel members 19 and 20, connected by vanes 21, the annular member 20 being a core ring and the annular member 19 conforming correspondingly in curvature to the shells 13 and 16 of the impeller 10 and turbine 11, respectively. The impeller 10 is drivingly connected to a drive shaft 22 by a plate 33 and the turbine 11 is connected to a driven shaft 24 rotatably mounted at one end in the sleeve shaft 22. The stator 12 is supported by means of a one-way brake OW on a stationary sleeve 25 surrounding the illustrated portion of the driven shaft 24. The plate 23 and impeller shell 13 define a fluid chamber 26, and the impeller, turbine and stator define a closed fluid circuit 27 within which the vanes of these vaned elements function, in cooperation with the reaction provided by the holding of the stator against rotation by the one-way brake OW, to multiply torque in a well-known manner. The vanes may be formed with curvatures shown and described in co-pending application Serial No. 203,698, now Patent No. 2,663,149, dated December 22, 1953.

Referring more specifically to the improved mounting assembly for the impeller 10, turbine 11, and stator 12, the shell 13 of the impeller 10 has a radially extending flange portion 28, and an axially extending sleeve hub 29 mounted for rotation about the stationary sleeve 25, the hub 29 being inserted within the axial opening in the shell 13 and secured, as by welding, to the circular edge of the flange portion 28. To prevent axial movement of the shell rearwardly of the hub 28, the hub is provided with a projection 30 providing a shoulder engaging the adjacent side of the flange portion 28 of the shell 13.

The shell 16 of the turbine 11 has a radially inwardly extending flange portion 31 located alongside a radial flange 32 of the turbine hub 33 to which it is connected by rivets 34, the hub having a splined connection, as at 35, to the driven shaft 24.

The stator 12 has its annular shell 19 secured, as by welding, to a hub 36. The hub 36 and an annular hub member 37, in telescoping relation, also function as radially outer and inner races between which are disposed sprags 38 of the one-way brake OW and identical spacer rings 39 and 40 in engagement with the opposed cylindrical surfaces 41 and 42 of the hub 36 and hub member 37, the sprags 38 being positioned between the rings 39 and 40 as shown in Figs. 1 and 6. The hub member 38 is splined, as at 43, to the stationary sleeve 25. The sprags of the one-way brake are provided with central openings through which extends an annular coiled spring 44 acting against the sprags to tilt the sprags to engage the races 36 and 37 to prevent rotation of the hub 36 and thereby the stator in one direction of rotation, the sprags tilting against the action of the spring 42 when the hub 36 rotates in the opposite direction of rotation to release the stator for rotation relative to the stationary sleeve 25.

Disposed on opposite sides of the hubs 36 and 37 are a pair of identical combination bearing and thrust washers 45 and 46. The washer 45 engages the adjacent sides of the hubs 36 and also an annular washer-like member 47 secured, as by welding, to the radially extending flange portion 28 of the impeller shell 13. The washer 46 is disposed between and engages the adjacent sides of the hub 36 and the radially extending flange 32 of the turbine hub 33.

As seen in Figs. 2 and 3, each of the bearing and thrust washers 45 and 46 comprise a flat annular metal disc having flat parallel sides and formed with three tongues or tangs 48 extending angularly of the plane of the disc and the axis of the disc and disposed in equi-spaced relation circumferentially of the disc. As seen in Fig. 1, the tangs 48 on the washer 45 project within outwardly opening slots 49 in the annular washer-like member 47 providing connections between the washer 45 and the impeller shell 13 compelling the washer to rotate with the impeller. In like manner, the tangs on the washer 46 also project within slots 50 in the radially extending flange 32 of the turbine hub 33 to connect the washer 46 and turbine shell 16 for conjoint rotation.

Referring to Figs. 1 and 3, the washers 45 and 46 are preferably formed of steel and each washer is provided on one side thereof with a bronze coating 51 to provide a bearing face 52, the bearing faces of the washers engaging the adjacent sides of the hub 36, respectively.

During rotation of the hydraulic torque converter to multiply torque, the impeller 10 is driven by the drive shaft 22 and the curved vanes and rotary motion of the impeller causes fluid to circulate in the direction indicated by the arrows in Fig. 1, the vanes directing the fluid into the turbine 11 and the turbine vanes absorbing the energy of the fluid to rotate the turbine. During relative rotational speeds of the impeller and turbine when the converter is thus multiplying torque, the stator 12 is held stationary by the one-way clutch OW and the consequent axial thrust of the stator, caused by the circulating fluid, is through the hub or outer race 36 to either of the bearing and thrust washers 45 and 46. It may be noted that the inner race or hub 37 is merely positioned so as not to leave excessive end play or axial movement.

An important feature of the invention is the function of the spacer rings 39 and 40 in the mounting assembly to accurately position the hub 36 of the stator in spaced concentric relation to the hub 37 of the stator to thereby maintain the hub 36 and the stator concentric to the axis of the converter, as are the hub 38 and sleeve 25. More particularly, and referring to Figs. 4 and 5, each spacer ring is provided with radially inner and outer concentric surfaces 53 and 54, the inner surfaces 53 of the rings engaging the complementary cylindrical surface of the inner race or hub 37 and the outer surfaces 54 engaging the cylindrical surface of the outer race or hub 36, the rings thus acting to also support the hub 36, and thereby the stator, on the hub 37.

Referring to Fig. 1, the torque converter is of the type wherein the pressure of the working fluid in the fluid circuit may be varied and, to this end, fluid under pressure, supplied by a pump (not shown), is directed to the converter through an axially extending passage 55 and a radial passage 56 in the stationary sleeve shaft 25 radially aligned with passages 57 in the hub 37 and into a chamber containing the mounting assembly. The fluid under pressure is conducted to the working fluid circuit of the converter by readily passing through the radially aligned passages 56 and 57 into the space between the spacer rings 39 and 40 and containing the one-way clutch sprags. The spacer rings 39 and 40 are of I-section to provide channels 58 and 59 in opposite sides thereof, there being three spaced notches 60 in the outer periphery of each ring and which extend transversely through the radially outer flange 61 of each ring, and also three spaced notches 62 in the radially inner flange 63 of each ring. Fluid under pressure will flow through the channels adjacent the sprags and through the notches 60 in each ring and the spaced slots 64 in each of the bearing and thrust washers 45 and 46, and between the hub 36 and the impeller and turbine hubs into the fluid circuit of the torque converter for movement in the direction indicated by the arrows. The fluid under pressure in the fluid circuit can pass through the opening 65 between the impeller and turbine shells 13 and 16 into the chamber 26 and thence through a passage 66 to a passage 67 axially located in the driven shaft 24 to a reservoir (not shown). The notches 62 in each ring are effective to insure ample lubrication of the engaged bearing surfaces of the rings and hub 37 by a certain portion of the fluid passing therethrough and into the channels of the rings adjacent the thrust washers and then through the notches or slots 64 in the washers into the converter fluid circuit.

It will be apparent from the above description that the mounting structure and arrangement is designed so that the oil, conventionally used as the working fluid in hydraulic torque converters, will afford continuous and adequate lubrication of the engaging relatively rotatable parts of the converter.

Although I have illustrated my improved mounting in connection with relatively rotatable parts of a hydraulic torque converter, it will be readily apparent that such mounting is capable of use with relatively rotatable parts of mechanisms, for example, gear transmissions and the like.

I claim:

1. In combination, a plurality of elements having passages therein; hubs respectively connected to and supporting said elements for relative rotation about an axis and having adjacent radially extending surfaces; and a thrust washer interposed between and engaging said surfaces and having a tang projecting at an angle to the plane of said washer and into an opening in one of said hubs, said washer having a plurality of notches extending radially inwardly of the outer edge thereof and the other of said hubs to provide channels communicating with the passages in said elements.

2. In combination, a plurality of elements having passages therein; hubs respectively connected to and supporting said elements for relative rotation about an axis and having adjacent radially extending surfaces; and a thrust washer interposed between and engaging said surfaces and having a tang projecting at an angle to the plane of said washer and into an opening in one of said hubs, said washer having a plurality of notches extending radially inwardly of the outer edge thereof to provide channels communicating with said passages.

3. In combination, a plurality of elements; axially spaced hubs respectively connected to and supporting said elements for relative rotation about an axis, one of said hubs being disposed between the other hubs; and a plurality of thrust washers respectively disposed between and engaging said hubs and each washer having generally parallel sides with one of said sides providing a bearing surface engaging the adjacent side of said one hub, and a tang projecting at an angle to the plane of the washer and within an opening in the adjacent other hub for connecting the washer and adjacent other hubs for conjoint rotation, each washer also having spaced notches therein extending radially inwardly of the outer edge thereof to provide channels.

4. In combination, first, second and third elements having axially spaced hubs supporting the same for rotation about the axis; said first hub being positioned between said second and third hubs and having axially extending surfaces in opposed relation to surfaces on said second and third hubs; and annular thrust washers between opposed surfaces of said hubs and having bearing surfaces in engagement with the surfaces of said first hub, and tangs on each washer extending at an angle to the plane of the washer, the tangs on one of said washers extending into openings in said second hub and the tangs on the other of said washers extending into openings in said third hub, each washer having spaced notches extending radially inwardly of the outer edge thereof and said first hub to provide channels.

5. A thrust washer comprising an annular body having substantially parallel sides, one of said sides serving as a bearing surface, and a plurality of tangs each extending from the other of said sides of said body and at an angle to the plane of said body, and a plurality of notches in said body extending radially inwardly of the outer edge thereof and defining fluid-conducting channels terminating generally intermediate the radially inner and outer edges of said body, said notches and tangs being spaced alternately and substantially equidistantly circumferentially of said body.

References Cited in the file of this patent

UNITED STATES PATENTS

| Number | Name | Date |
|---|---|---|
| 487,247 | Dawson | Dec. 6, 1892 |
| 752,263 | Rose | Feb. 16, 1904 |
| 901,866 | Atkinson | Oct. 20, 1908 |
| 1,020,552 | Henry | Mar. 19, 1912 |
| 1,337,700 | Hemmer | Apr. 20, 1920 |
| 1,515,681 | Hill | Nov. 18, 1924 |
| 1,808,980 | Gamble | June 9, 1931 |
| 1,948,176 | Hopkins | Feb. 20, 1934 |
| 2,043,790 | Baker | June 9, 1936 |
| 2,124,060 | Gilman | July 19, 1938 |
| 2,187,937 | De Lavaud | Jan. 23, 1940 |
| 2,325,404 | Irons | July 27, 1943 |
| 2,388,424 | Lund | Nov. 6, 1945 |
| 2,428,962 | Davis | Oct. 14, 1947 |
| 2,542,913 | Ensign | Feb. 20, 1951 |
| 2,588,668 | Syrovy | Mar. 11, 1952 |

FOREIGN PATENTS

| Number | Country | Date |
|---|---|---|
| 474,698 | Germany | Apr. 6, 1929 |
| 552,013 | Great Britain | Mar. 19, 1943 |